United States Patent [19]
Miyawaki

[11] Patent Number: 5,822,028
[45] Date of Patent: Oct. 13, 1998

[54] LIQUID CRYSTAL DISPLAY DEVICE

[75] Inventor: Mamoru Miyawaki, Isehara, Japan

[73] Assignee: Canon Kabushiki Kaisha, Tokyo, Japan

[21] Appl. No.: 714,438

[22] Filed: Sep. 16, 1996

[30] Foreign Application Priority Data

Sep. 14, 1995 [JP] Japan .................................. 7-236859
Sep. 12, 1996 [JP] Japan .................................. 8-241936

[51] Int. Cl.⁶ .................................................. G02F 1/1333
[52] U.S. Cl. ............................................ 349/111; 349/86
[58] Field of Search .................................... 349/86, 111

[56] References Cited

U.S. PATENT DOCUMENTS

| 5,317,433 | 5/1994 | Miyawaki | 359/59 |
| 5,513,028 | 4/1996 | Sano et al. | 359/87 |
| 5,530,266 | 6/1996 | Yonehara et al. | 257/72 |
| 5,724,109 | 3/1998 | Nakamura | 349/86 |

FOREIGN PATENT DOCUMENTS

| 0338412 | 10/1989 | European Pat. Off. . |
| 5-297382 | 11/1993 | Japan . |
| 7-120744 | 5/1995 | Japan . |
| WO20880 | 9/1994 | WIPO . |

OTHER PUBLICATIONS

Nagata et al., Inst. Elec. Inf. & Comm. Eng. EID 94–77 (1994–10) 97–101.

Primary Examiner—William L. Sikes
Assistant Examiner—James A. Dudek
Attorney, Agent, or Firm—Fitzpatrick, Cella, Harper & Scinto

[57] ABSTRACT

A liquid crystal display device is provided which exhibits high performance of high fineness, high brightness, high contrast of images, and high compactness and low cost of the device. The liquid crystal device has an electroconductive layer under picture element electrodes, and the state of the polymer dispersion type liquid crystal is changed to a scattering mode in the region surrounding the picture element electrodes by application of voltage applied to the electroconductive layer.

16 Claims, 8 Drawing Sheets

LIQUID CRYSTAL DISPLAY DEVICE

BACKGROUND OF THE INVENTION

1. Field of the Invention

The present invention relates to a display device for displaying images, characters, and the like, in particular, to a display device employing a liquid crystal.

2. Related Background Art

With development of multimedia in recent years, a man-machine interface is becoming important more and more which exchanges information through human sensitiveness. In such a situation, liquid crystal display devices are being studied actively for the display apparatus in the multimedia age in consideration of the thinness and compactness of the apparatus and less energy consumption.

The liquid crystal material for the liquid crystal display device includes TN (twisted nematic), STN (super twisted nematic), and FLC (ferroelectric liquid crystal). The liquid crystal display device employing the above liquid crystal changes the quantity of light by modulation of the light polarization characteristics of the liquid crystal. Either in transmission type or in reflection type of liquid crystal display device, the light passes through a polarization plate twice in an optical path from a light source to the display device and from it to the observer. The intensity of the light is decreased by the two passages through the polarization plate to 50% normally, or 30 to 40% with a high-contrast polarization plate. Furthermore, in consideration of an aperture ratio of the liquid crystal display device, the effective light utilization efficiency will be as low as several percent.

On the other hand, T. Nagata, et al. disclosed a reflection type of liquid crystal element for a projector without a polarization plate in which NCAP (nematic curuilinear aligned phase) is driven by a MOS chip [Technical Report IEICE (The institute of Electronics Information and Communication Engineers in Japan) EID94-77, 94–101 (1994)]. This paper shows a constitution of a light valve which has a light-intercepting layer provided on an active matrix substrate to prevent light leakage by intercepting the light introduced between picture element electrodes. However, this light-intercepting layer does not prevent satisfactorily the light leakage.

Further, when a peripheral driving circuit is provided on a peripheral region of an image displaying portion, a problem of a leak of light in the peripheral driving circuit may be offered.

SUMMARY OF THE INVENTION

An object of the present invention is to provide a liquid crystal display device which does not involve the aforementioned problems.

Another object of the present invention is to provide a liquid crystal display device which has sufficiently high overall performance such as high fineness, high brightness and high contrast of the formed images, and compactness and low cost of the device.

The liquid crystal display device of the present invention comprises a matrix substrate having picture element electrodes formed in correspondence with intersecting points of scanning lines and signal lines, a counter substrate having transparent electrodes in opposition to the picture element electrodes, and a polymer dispersion type liquid crystal held between the matrix substrate and the counter substrate, wherein an electroconductive layer is provided under the picture element electrodes to establish in a scattering mode at all times in response to the voltage applied to the electroconductive layer the state of the polymer dispersion type liquid crystal in at least a portion of regions between the picture element electrodes or a portion of peripheral regions of an image displaying region in which the picture element electrodes are arranged.

It is preferable in the present invention that the electroconductive layer serves as a light-intercepting layer.

It is preferable in the present invention that the picture element electrodes are connected to active elements having a switching function.

It is preferable in the present invention that the active element is a thin film transistor.

It is preferable in the present invention that the thin film transistor is constituted of a monocrystalline semiconductor layer.

It is preferable in the present invention that the active element is comprised of a monocrystal transistor.

It is preferable in the present invention that the active element is comprised of two kinds of n-channel monocrystal transistor and p-channel monocrystal transistor.

It is preferable in the present invention that two kinds of n-channel monocrystal transistor and p-channel monocrystal transistor form transmission gate.

It is preferable in the present invention that the monocrystal transistor is formed on a semiconductor substrate.

It is preferable in the present invention that the electroconductive layer is provided also above a peripheral driving circuit provided in the matrix substrate.

It is preferable in the present invention that the transparent electrodes provided on the counter substrate are divided and a measure for applying each of voltages different from each other to each of divided portions of the transparent electrodes is connected with each of the divided portions of the transparent electrodes.

It is preferable in the present invention that the divided transparent electrode is provided at a position being opposite to the picture element electrode.

It is preferable in the present invention that the electric field applied between the transparent electrode and the picture element electrode on one line of a matrix composed of the electrodes takes an opposite direction to that taken by an electric field applied therebetween on the neighboring line of the materix.

It is preferable in the present invention that the direction of the electric field applied between the transparent electrode and the picture element electrode turns into the opposite one at intervals of a specific time.

It is preferable in the present invention that another electrode exists at least between the transparent electrodes or on a peripheral region thereof, and a liquid crystal just under another electrode is set up so as to be in a scattering mode at all times.

In the liquid crystal display device of the present invention, the state of the polymer dispersion type liquid crystal is switched to a scattering mode in regions surrounding the picture element electrodes in response to the voltage applied to the electroconductive layer. Thereby, light introduced to the active element is reduced to the minimum level, and the light leakage is prevented substantially or mostly. Consequently, high fineness, high brightness, high contrast, and high color reproducibility are achieved by the liquid crystal display device of the present invention. The high brightness can be achieved by the liquid crystal display apparatus of the present invention because no polarization plate of high-performance is employed.

DESCRIPTION OF THE PREFERRED EMBODIMENTS

Figure 1A:
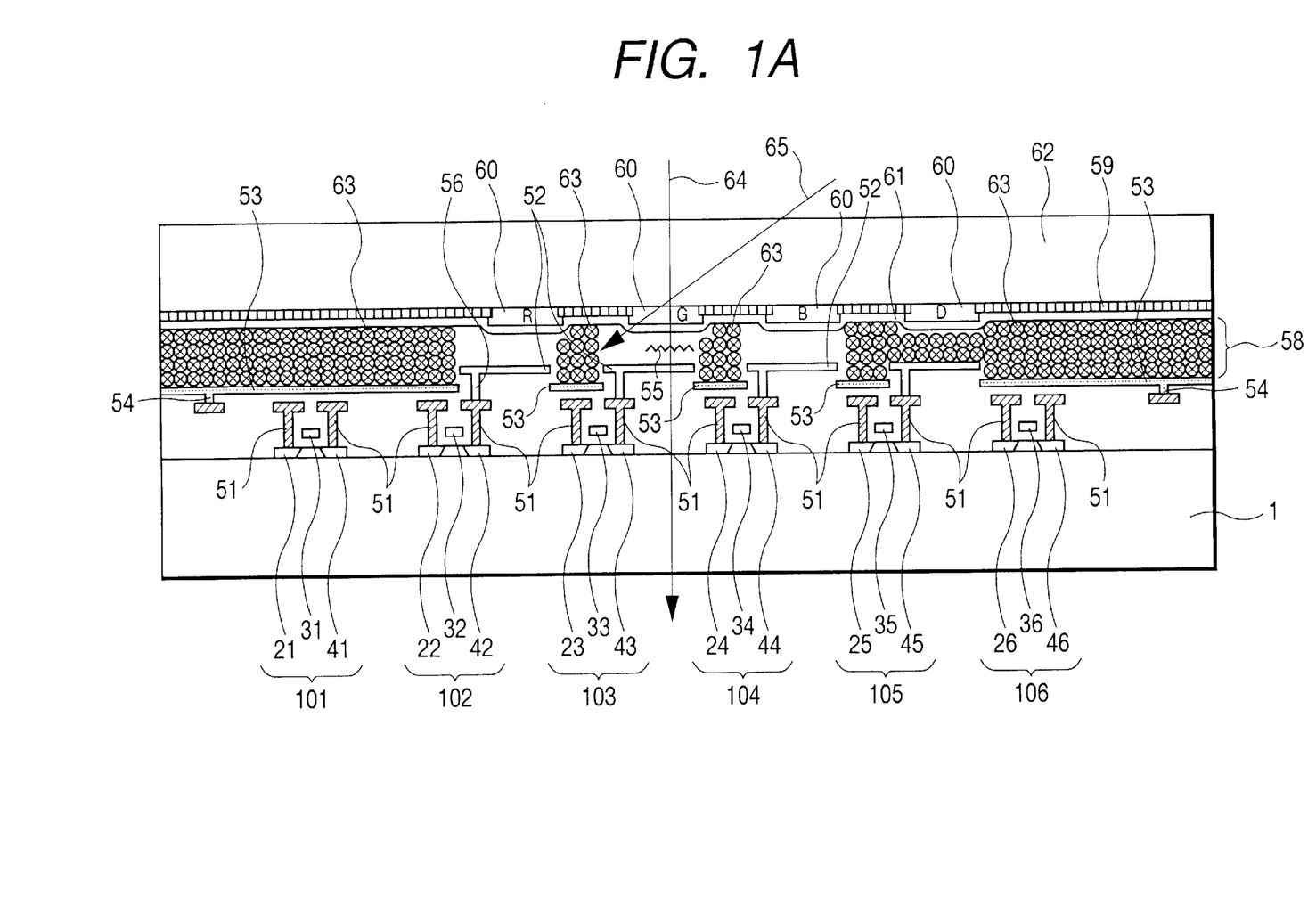
FIGS. 1A and 1B illustrate schematically an example of the liquid crystal display device of the present invention.

An example of the liquid crystal display device of the present invention is explained by reference to FIG. 1A and FIG. 1B. FIG. 1A is a sectional view of a display face of an liquid crystal display panel taken on the line 1A–1A in FIG. 1B.

Figure 1B:
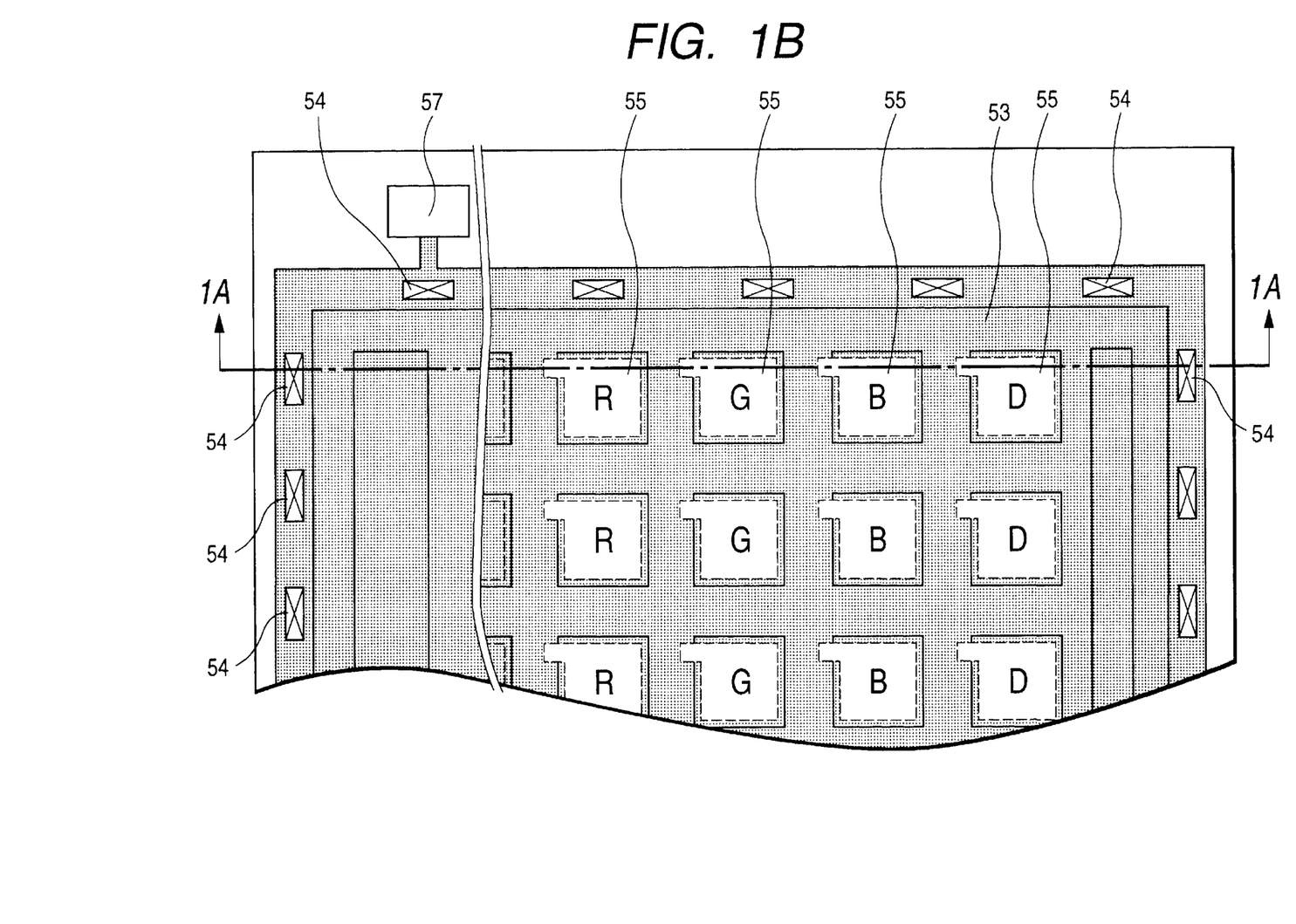

In FIGS. 1A and 1B, a matrix substrate 1 has picture element electrodes 52 arranged in matrix. The substrate 1 is usually made of a transparent material such as quartz and glass. A counter substrate 62 has a transparent electrode 61 opposing to the picture element electrodes 52. A polymer dispersion type of liquid crystal is held between the matrix substrate 1 and the counter substrate 62. On the matrix substrate 1, thin film transistors (hereinafter occasionally referred to TFT) 101, 102, 103, 104, 105 and 106 are formed. Each of the thin film transistor is constituted of a source 21, 22, 23, 24, 25, or 26, a drain 41, 42, 43, 44, 45, or 46, and a gate 31, 32, 33, 34, 35, or 36. The thin film transistors 101 and 106 constitute a peripheral circuit for driving of the panel. The thin film transistors 102, 103, and 104 respectively serves to switch the picture element to be displayed. The respective transistors confront color filters 60 (R, G, and B). The gates 32, 33, 34 constituting the TFT of the display region are connected to scanning lines not shown in the drawing, and the scanning lines intersect signal lines connected to the source. The picture element electrodes 52 are provided corresponding to the intersection points. The thin film transistor 105 is a dummy electrode of the picture element provided in the periphery of the display region and having the same structure as the thin film transistor in the display region. A wiring metal layer 51 is provided on or above the sources and drains of the thin film transistors in the display region (including the dummy regions). The sources are connected to the signal lines, and the drain is connected to the picture element electrodes 52. An electroconductive layer 53 is provided above the wiring metal layer 51 and below the picture element electrodes 52, and serves as a light-intercepting layer. As understood from FIG. 1B, the electroconductive layer 53 covers the entire face of the device except the opening portions 55 of the picture elements and the through hole portions 56 for connecting the wiring metal layer 51 to the picture image element 52.

The electroconductive layer 53 serving as the light-intercepting layer is connected to the wiring metal layer via through holes 54 which are different from the aforementioned through holes. The wiring metal layer connects the electroconductive layer 53 to a power source via a pad 57 for a desired potential. A black matrix 59 is provided on the counter substrate 62, and is usually made of chromium.

The characteristics of a polymer dispersion type liquid crystal is explained below regarding a normally-off type liquid crystal which is in a scattering mode without voltage application, and turns into a transparency mode on application of voltage. Usually, this type of liquid crystal has such characteristics.

Video signals are transmitted from the signal lines to the picture element electrodes via sources and drains of selected TFT. The signal potential is held by retention capacity of overlapping portion of the light-intercepting electroconductive layer 53 and the picture element electrode 52.

To the light-intercepting electroconductive layer, a voltage is applied at nearly the same level as the voltage applied to the common transparent electrode 61. Thereby the liquid crystal layer between the picture elements is kept in a scattering mode as shown by the numeral 63 in FIG. 1A. By application of the same signal to picture element electrode of the dummy picture element, the liquid crystal layer is also in the scattering mode in the dummy picture element and the peripheral circuit.

In this scattering mode, a portion 64 of illumination light introduced nearly perpendicularly to the picture elements passes through the picture element electrodes except the black matrix portion and the light-intercepting electroconductive layer. On the other hand, the light introduced obliquely to a conventional display panel usually causes color mixing. For example, the light transmitted through a color filter of G passes through the liquid crystal layer modulated by adjacent R electrode to cause color mixing. However, in the constitution of the present invention, the liquid crystal layer is kept in a scattering mode at the region between the picture element electrodes, the dummy picture element portion, and peripheral circuit portion. Therefore, the light projected obliquely to the adjacent picture element is intercepted as shown by the numeral 65 in FIG. 1A not to enter the adjacent picture element. Thereby, the display device realizes excellent color reproducibility. Moreover, the structure of the present invention does not require the light polarization plate, giving high brightness of display.

The device of the present invention has a structure that the voltage is not applied to the light-intercepting metal layer and the liquid crystal layer in the dummy picture element portion, so that baking or other failure does not occur advantageously. The present invention is applicable either to a transmission type or to a reflection type of liquid crystal device.

Example 1

Figure 2:
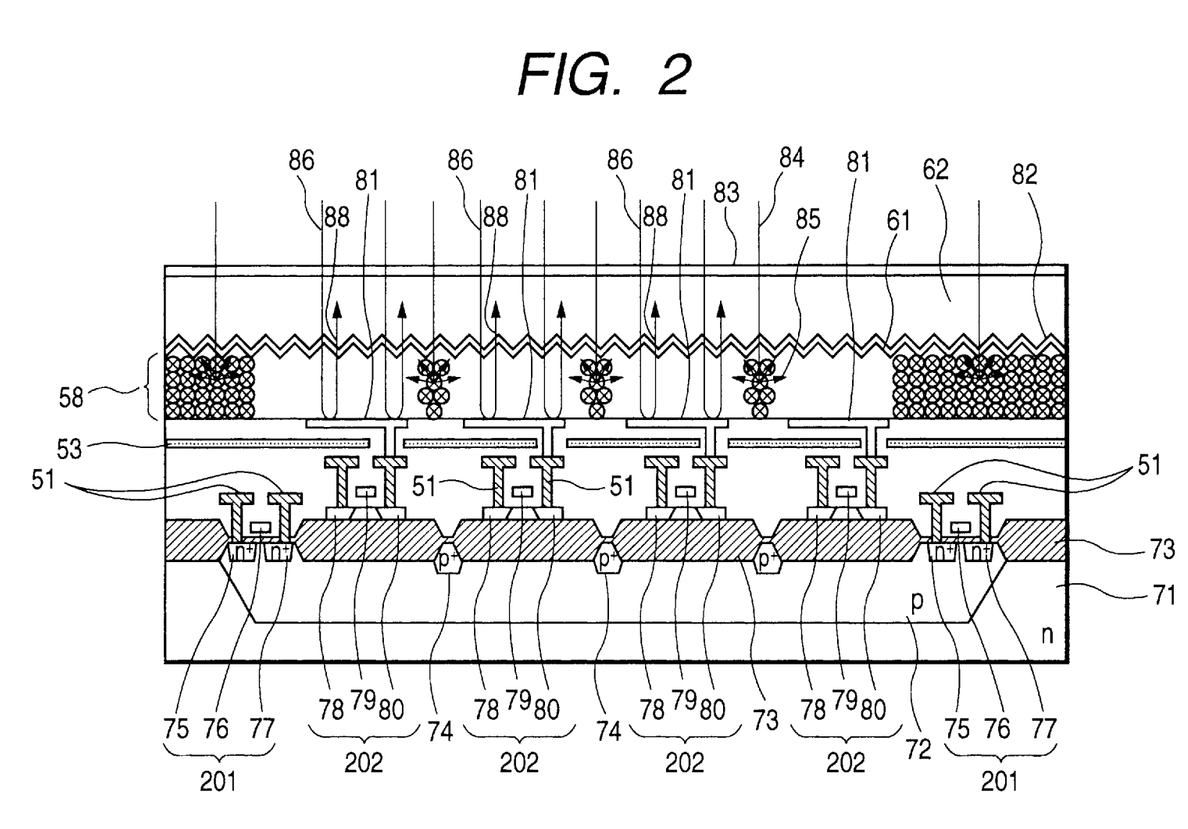
FIG. 2 illustrates schematically another example of the liquid crystal display device of the present invention.

This Example shows a reflection type of liquid crystal display. FIG. 2 illustrates schematically a reflection type liquid crystal display according to the present invention. In the device in FIG. 2, an active matrix substrate is constituted of a semiconductor substrate 71, and transistors 202, a light-intercepting electroconductive layer 53, picture element reflection electrodes 81, and so forth formed thereon. The liquid crystal display device is constituted of the above active matrix substrate, a counter substrate 62 having thereon a transparent common electrode 61, and a polymer dispersion type liquid crystal 58 held between the active matrix substrate and the counter substrate 62. The semiconductor substrate 71 is an n-type substrate in this Example, but may be a p-type substrate. The numeral 72 denotes a p-well; the numeral 73, a field oxidation film; and the numeral 74, a high p⁺ concentration layer for setting the p-well potential. The numerals 75, 76, and 77 denotes respectively sources, gates, and drains of a MOSFET 201 employing a monocrystalline Si as the semiconductor layer, and the MOSFET 201 constitutes the peripheral circuit of the display panel.

Although an n-type MOSFET constitution is illustrated in FIG. 2, a p-type MOSFET, or npn or pnp bipolar transistor may be employed. The numerals 78, 79, and 80 denotes respectively sources, gates, and drains of the thin film transistors 202 constituting the picture element switching means. The sources are connected to signal lines, and the gates are connected to scanning lines, respectively.

The numeral 51 denotes a metal wiring connected to sources and drains. A picture element reflection electrode 81 is connected via the metal wiring 51 to a drain 80. In this example, a TFT is used as the picture element switch, but a MOSFET constituting the peripheral circuit may be used therefor. The picture element reflection electrode 81 is preferably flat and has preferably a high reflectivity. For improvement of the flatness, the underlying insulating reflection electrode is preferably subjected to treatment of CMP (chemical mechanical polishing). The inside surface of the counter substrate 62 is roughened as indicated by the numeral 82 to prevent regular reflection at the surface. A reflection-preventing film 83 is formed on the reflection side surface of the counter substrate 62. The incident light 84 introduced into the boundary portion between picture elements is scattered by the liquid crystal layer which is kept in a scattering mode by application of a voltage as shown by the numeral 85 in FIG. 2. On the other hand, the light 86 introduced to the picture element portion is modulated regularly and reflected as shown by the numeral 88.

In the reflection type of liquid crystal display panel, a light-intercepting layer like a black matrix is not sufficiently effective in the boundary portion of the picture elements, but scattering of light by a liquid crystal layer is more effective as in this Example. This is because the black matrix inevitably reflects light regularly at the surface of the black matrix to give noise light. The phenomenon is the same in the dummy picture element portion and the peripheral circuit portion.

The constitution of this Example gives high contrast and excellent color reproducibility of the image, and high brightness owing to the increase of the effective light utilization efficiency. Further, a small-pitched highly drivable circuit can be constituted of the transistors formed and driven on a semiconductor substrate.

Example 2

In the above Example described by reference to FIGS. 1A, 1B, and 2, a constant voltage is applied to the electroconductive light-intercepting layer. In this Example, the voltage is varied with time.

To prevent flicker, the applied signal is reversed usually for every 1H. Therefore, the peripheral driving circuit should be drivable with a amplitude of double the voltage to be applied to the liquid crystal layer.

In this Example, the counter substrate and the electroconductive light-intercepting layer are divided for every 1H, and the counter substrate and the electroconductive light-intercepting layer is driven reversely without reversal of the image picture signal. The counter substrate for the liquid crystal layer affected by the voltage of the light-intercepting layer is brought to the same potential as the light-intercepting layer. Thereby, the required dielectric strength is halved, and the structure can be made finer.

Example 3

Figure 3:
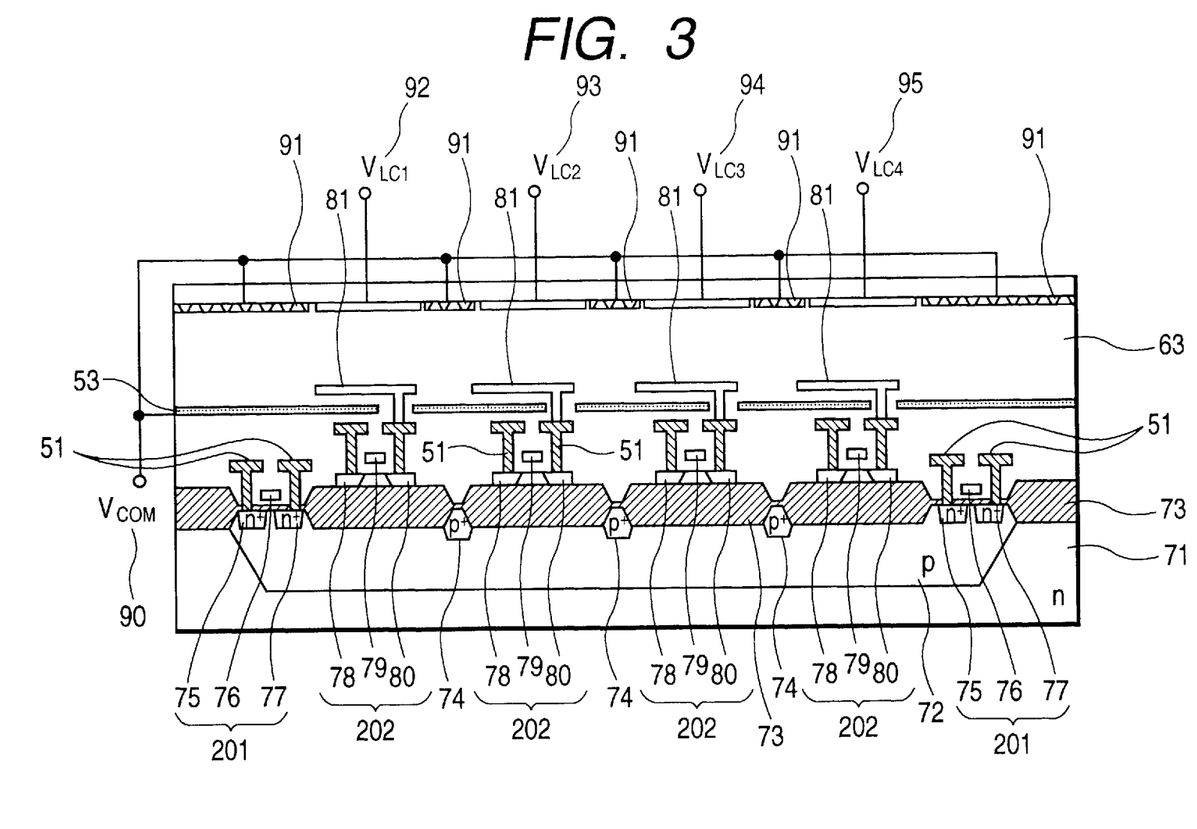
FIG. 3 illustrates schematically still another example of the liquid crystal display device of the present invention.

This Example is described by reference to FIG. 3. In FIG. 3, the same member or part as in FIG. 2 is denoted by the same reference numeral without explanation.

In the liquid crystal display device of this Example, the driving potential of the peripheral circuit is reduced by half by reversing the voltage at the counter substrate side.

In FIG. 3, voltage $V_{COM}$ is applied by a terminal 90 to an electroconductive light-intercepting layer 53 and to a portion of a transparent electrode 91 provided around another portions of the transparent electrode on the counter substrate for applying a reversed signal. Each of terminals 92 to 95 applies reversed signal. These terminals are provided independently, but is preferably connected to the output of the scanning circuit provided on the semiconductor substrate side.

Then, the direction of an electric field applied between the transparent electrodes on the counter substrate connecting with terminals 92 through 95 and picture element reflection electrodes 81 is made to turn into the opposite one in accordance with a lapse of time. In this case, it is acceptable to make a polarity of the electric fields applied therebetween on each of the electrode lines turn into the opposite polarity to that applied on the neighboring line. In the same manner as shown in FIG. 2, the reversed voltage is applied to the transparent electrodes opposing to the respective picture element reflection electrodes, and $V_{COM}$ is applied to the portion opposing to the periphery of the picture element reflection electrodes and the peripheral circuit. Thereby, the liquid crystal layer is kept in a scattering mode except in the portions of the picture element electrodes, and the effect of the present invention is achieved. Since the potential of the electroconductive light-intercepting layer at the semiconductor substrate side is not required, the constitution of the device is simplified.

In Examples 2 and 3, the reversal period is set to be 1H. However, the construction of the peripheral circuit is not limited thereto.

Example 4

Figure 4:
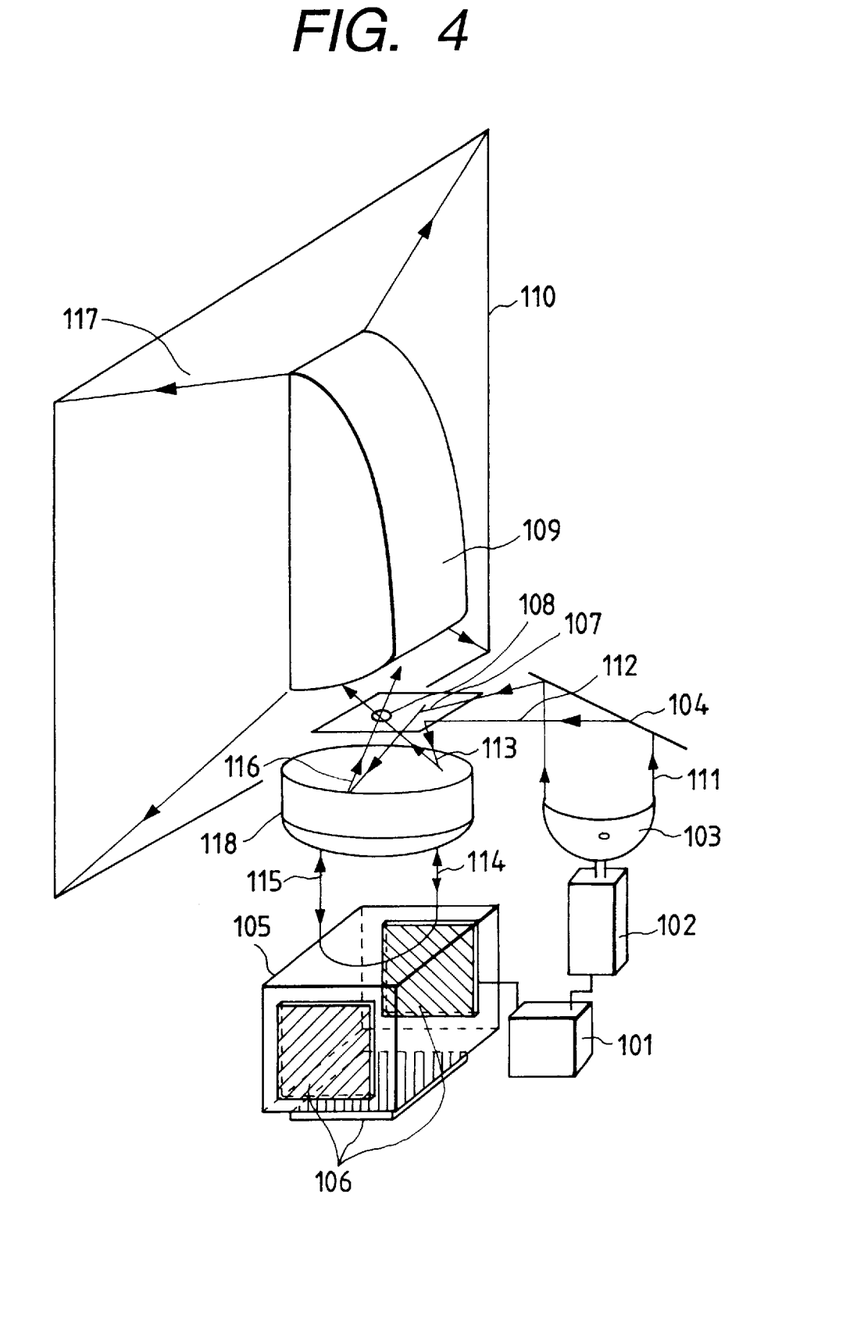
FIG. 4 illustrates schematically a display apparatus employing the liquid crystal display device of the present invention.

This Example is described by reference to FIG. 4. FIG. 4 is a schematic diagram of a display apparatus employing liquid crystal display device shown in FIGS. 1A and 1B to 3. In FIG. 4, the device comprises a board 101 for controlling liquid crystal panel drive and a light source, a power source unit 102 for a light source, a light source 103, an aspherical mirror 104, a color separation prism 105, a liquid crystal panel 106 of the present invention, a micromirror 107, an aperture 108, an optical system 109 having a free-form surface prism, and a screen 110.

A light flux 111 emitted from the light source 103 is condensed by the aspherical mirror 104 and forms an image on the micromirror 107. The light reflected by the micromirror is separated by the color separation prism 105 into R, G, and B, and is introduced as parallel light into the panel 106. The lens 118 is set in a telecentric system. The reflected light 115 modified in accordance with display signal is again introduced to the lens 118. Dark display light only is allowed to pass the aperture 108, and is introduced to the free-from surface prism 109. Owing to the free-form surface prism system, an image is formed on the screen 110 with less aberration by a thinner apparatus.

Thus a rear type or a front type of projection display apparatus is produced in a small size for forming images with high resolution, high brightness, and high contrast in a low cost.

Such a display apparatus is useful not only for home TVs but also for computer monitors, car navigation display apparatuses, picture phone meeting systems, display panels of airplanes or the like, three-dimensional picture game machines, and other uses.

Example 5

An example of a spectacle type display employing the liquid crystal display device of the present invention is explained by reference to FIGS. 5A and 5B and FIG. 6.

Firstly, the optical system for display in this Example is explained by reference to FIG. 6. In FIG. 6, the numeral 4 denotes a liquid crystal display device as shown in FIGS. 1A and 1B to 3. This display device shown by the numeral 4 as one unit comprises a light source, a beam splitter, a schlieren optical system, and a display panel. The numeral 3a denotes a first optical member for introducing the light to an eye of an observer, and the numeral 3b denotes a second optical member. The light from the display means 4 is firstly introduced to the first optical member 3a, reflected totally by the total reflection face 1 at the observer's side of the first optical member, then reflected by a concave half mirror 2 having the concave face directed to the observer, and introduced through the total reflection face 2a to the eye of the observer.

Figure 5A:
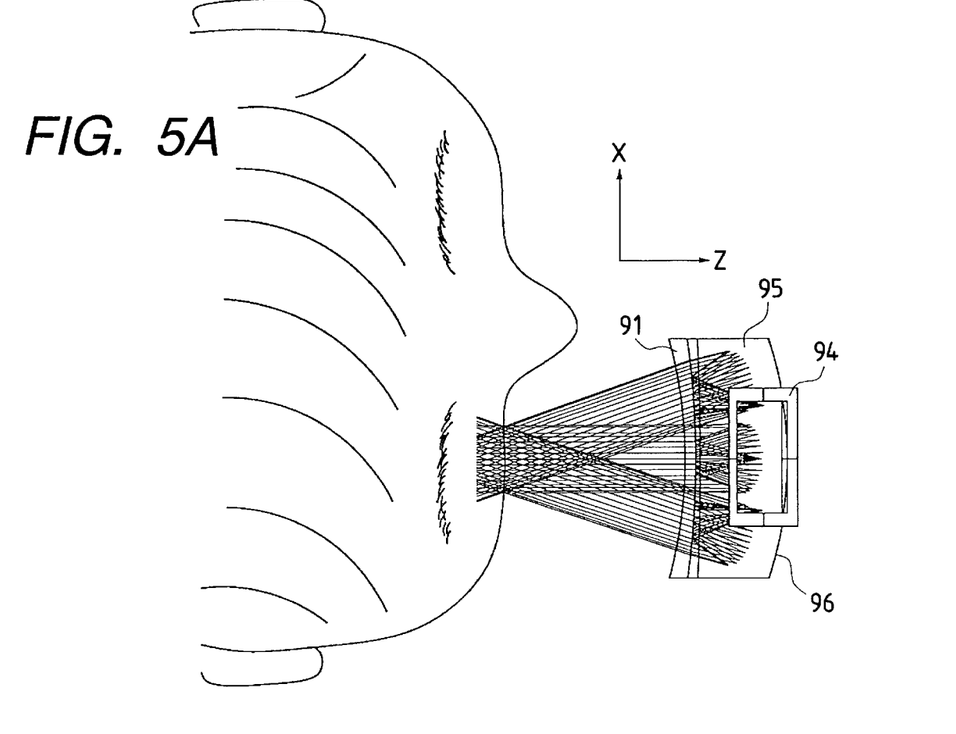
FIGS. 5A and 5B illustrate schematically application of the liquid crystal display device of the present invention to a spectacle type display.
Figure 5B:
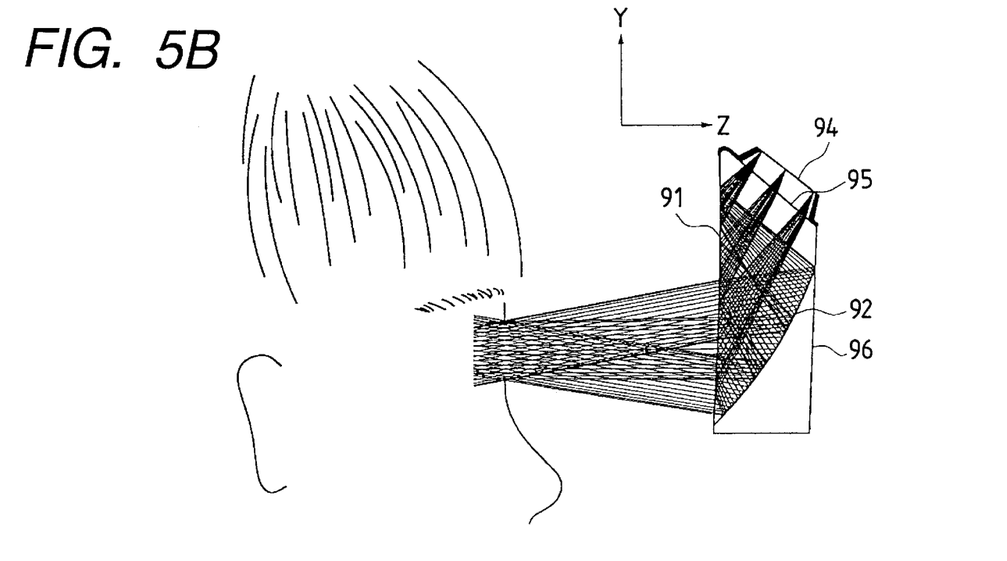
Figure 6:
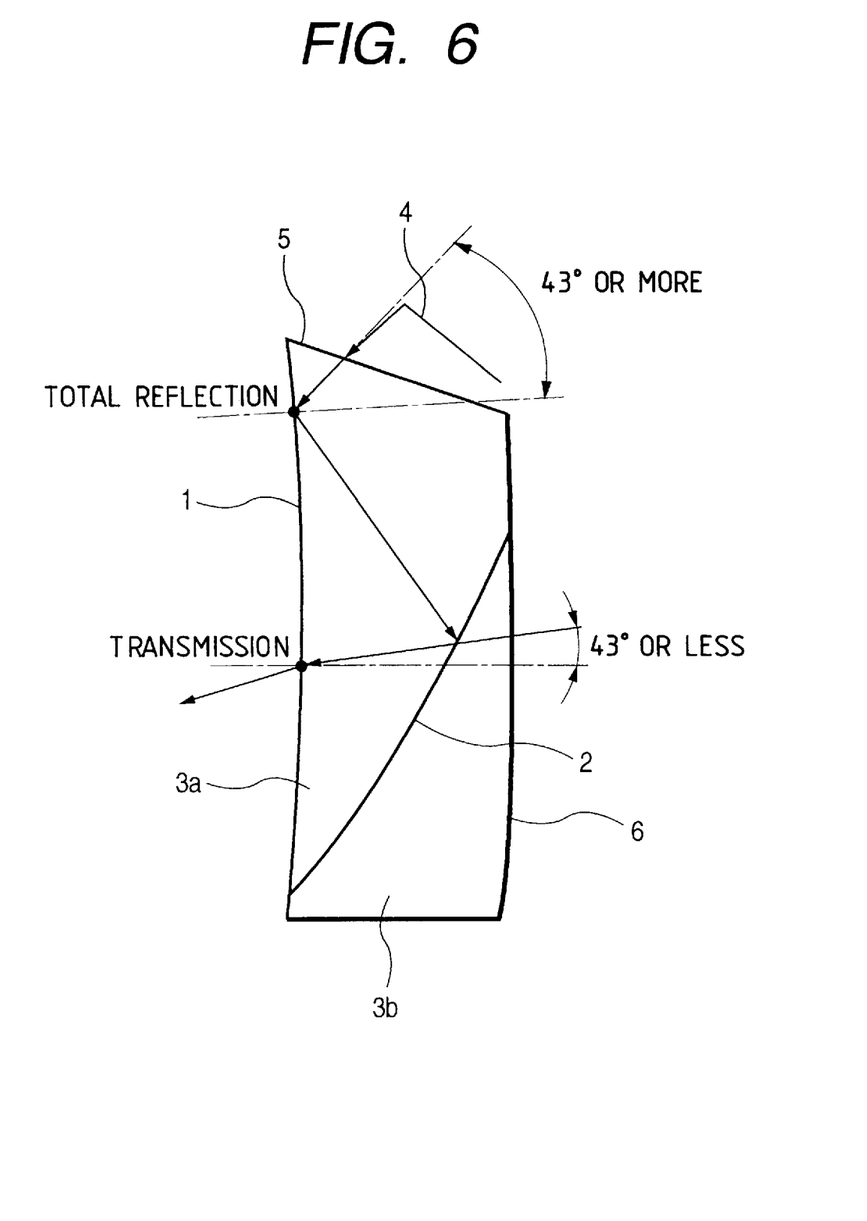
FIG. 6 illustrates schematically an optical system for the liquid crystal display device.

The optical paths are shown in FIG. 5A (viewed vertically from above the observer) and in FIG. 5B (viewed horizontally from the lateral side of the observer). Thus the observer can observe the image of the display means 4 in superimposition over an outside scenery. This Example shows an application of the liquid crystal display device of the present invention to a superimposition apparatus. The apparatus, however, may be used as an apparatus for observing only the image display. In this case, the concave half mirror serves as a normal mirror.

In this Example, the display apparatus is very thin and small-sized with a horizontal visual field angle of about ±16.8° and a vertical visual field angle of about ±11.4°.

The small size of the apparatus, the wide visual field angle, and excellent optical performance can be achieved by the use of the face of the optical system as a total reflection face as well as a light-transmitting face, and by use of the concave mirror 2b decentered remarkably from the optical axis of the eye. Another contribution factor therefor is the curved total reflection face having optical power variable depending on the azimuthal angle, or the optical power given to the concave mirror 2 at an azimuthal angle.

In particular, the aberration caused by decentering of the concave mirror can be sufficiently eliminated by application of the optical power to the concave mirror at an azimuthal angle. The aberration at the concave mirror is corrected by concaving the total reflection face similarly.

Example 6

A switch of each of the picture elements in this example has a constitution of transmission gate comprised of n-channel MOSFET and p-channel MOSFET of monocrystal, in which constitution only the lower portion of the n-channel MOSFET is buried in the p-type well region, and p-channel MOSFET is buried n-type well region. As the substrate, p-type substrate is employed.

Figure 7:
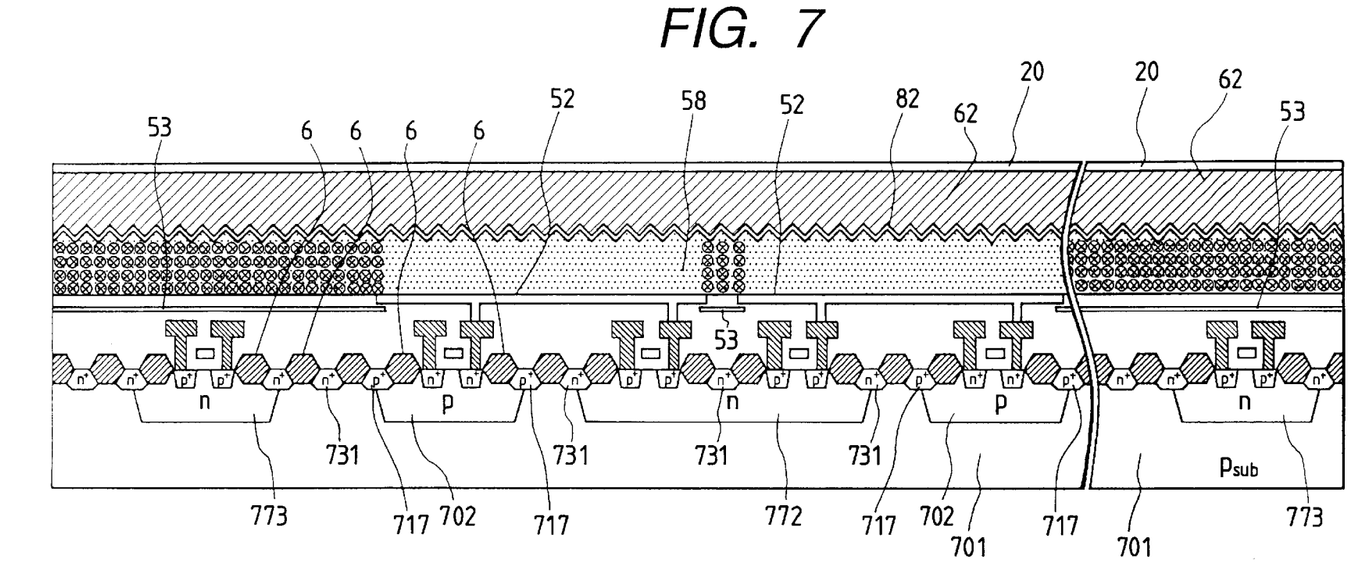
FIG. 7 is a sectional drawing of the liquid crystal display device in Example 6 of the present invention.

FIG. 7 is a sectional view of a liquid crystal panel of this Example. In the figure, numeral 20 denotes a reflection-preventing film; 723, n-channel MOSFET; 724, p-channel MOSFET; 53, light-intercepting layer; 52, picture electrode; 717, p-type highly concentrated impurity region; 731, n-type highly concentrated impurity region; 702, p-type well region; 701, p-type substrate; 772, n-type well region to which a source potential of the image displaying portion is applied; and 773, n-type well region to which a source potential of the peripheral driving circuit is applied. The same numerals in this figure as in the preceding figures have the same meanings, hence the explanations thereof are omitted.

As n-type substrate is employed in the embodiment of Example 2, the potential of the substrate is set up into the same as the lowest potential of the source. In this case, a standard potential of the panel is usually stable at the ground potential, which enables measures for a jig for fixing the panel such as preventing short of source, preventing the leak, providing an insulating material and so forth to be organized very easily, and makes to apply to n-type well regions 772 and 773 provided separately on the p-type substrate potentials different from each other respectively possible. As the result, it is made possible to realize the constitution where the image displaying portion has 20 through 35 V system and the peripheral driving circuit has 1 through 5 V system.

Further, the "twin-well structure" wherein p-type well region 702 and n-type well region 772 are provided in the image displaying portion enables a threshold of the transistor to become stable and the withstand pressure property to increase, so that the free degree is improved. In addition, the matter that the MOSFET as the switch consisting of monocrystal makes enough to deal with the high-speed operation possible.

Further, the embodiment of Example 6 makes the stable displaying property possible, wherein fluctuations of potential caused by generation of carrier originated by leak of light and based on the neighboring picture element are not generated, so that the stable displaying property can be realized. Further, since the transmission gate constitution wherein the switch of the displaying region consists of monocrystal is employed, the apparatus is not affected directly from Vth (threshold) of each FET. As the result, no decrease of the contrast in the peripheral region of the image portion is observed and there is little affection from the alternation of environment such as temperature, so that the displaying in fine quality can be obtained.

What is claimed is:

1. A liquid crystal display apparatus comprising a matrix substrate having picture element electrodes formed in correspondence with intersecting points of scanning lines and signal lines, a counter substrate having transparent electrodes in opposition to the picture element electrodes, and a polymer dispersion type liquid crystal held between the matrix substrate and the counter substrate, wherein an electroconductive layer is provided under the picture element electrodes to establish in a scattering mode at all times in response to the voltage applied to the electroconductive layer the state of the polymer dispersion type liquid crystal in at least a portion of regions between the picture element electrodes or a portion of peripheral regions of an image displaying region in which the picture element electrodes are arranged.

2. A liquid crystal display apparatus according to claim 1, wherein the electroconductive layer serves as a light-intercepting layer.

3. A liquid crystal display apparatus according to claim 1, wherein the picture element electrodes are connected to active elements having a switching function.

4. A liquid crystal display apparatus according to claim 3, wherein the active element is a thin film transistor.

5. A liquid crystal display apparatus according to claim 4, wherein the thin film transistor is constituted of a monocrystalline semiconductor layer.

6. A liquid crystal display apparatus according to claim 3, wherein the active element is comprised of a monocrystal transistor.

7. A liquid crystal display apparatus according to claim 6, wherein the active element is comprised of two kinds of n-channel monocrystal transistor and p-channel monocrystal transistor.

8. A liquid crystal display apparatus according to claim 7, wherein said two kinds of n-channel monocrystal transistor and p-channel monocrystal transistor form transmission gate.

9. A liquid crystal display apparatus according to any one of claims 6 through 8, wherein the monocrystal transistor is formed on a semiconductor substrate.

10. A liquid crystal display apparatus according to claim 1, wherein the electroconductive layer is provided also above a peripheral driving circuit provided in said matrix substrate.

11. A liquid crystal display apparatus according to claim 1, wherein the transparent electrodes provided on the counter substrate are divided and a measure for applying each of voltages different from each other to each of divided portions of the transparent electrodes is connected with said of the divided portions of the transparent electrodes.

12. A liquid crystal display apparatus according to claim 11, wherein said divided transparent electrode is provided at a position being opposite to the picture element electrode.

13. A liquid crystal display apparatus according to claim 12, an electric field applied between the transparent electrode and the picture element electrode on one line of a matrix composed of the electrodes takes an opposite direction to that taken by an electric field applied therebetween on the neighboring line of the matrix.

14. A liquid crystal display apparatus according to claim 12 or 13, the direction of the electric field applied between the transparent electrode and the picture element electrode turns into the opposite one at intervals of a specific time.

15. A liquid crystal display apparatus according to claim 13, wherein another electrode exists at least between the transparent electrodes or on a peripheral region thereof, and a liquid crystal just under said another electrode is set up so as to be in a scattering mode at all times.

16. A liquid crystal display apparatus according to claim 14, wherein another electrode exists at least between the transparent electrodes or on a peripheral region thereof, and a liquid crystal just under said another electrode is set up so as to be in a scattering mode at all times.

* * * * *

UNITED STATES PATENT AND TRADEMARK OFFICE
CERTIFICATE OF CORRECTION

PATENT NO. : 5,822,028
DATED : October 13, 1998
INVENTOR(S) : MAMORU MIYAWAKI

It is certified that error appears in the above-identified patent and that said Letters Patent is hereby corrected as shown below:

COLUMN 1

Line 34, "curuilinear" should read --curvilinear--.
    Line 36, "institute" should read --Institute--.

COLUMN 2

Line 25, "Form" should read --Form a--.

COLUMN 3

Line 26, "an" should read --a--.
    Line 33, "opposing" should read --opposite--.
    Line 37, "to" should read --to as--.
    Line 38, "transistor" should read --transistors--.
    Line 43, "serves" should read --serve--.

COLUMN 4

Line 22, "to" should read --to a--.

COLUMN 5

Line 11, "denotes" should read --denote--.

UNITED STATES PATENT AND TRADEMARK OFFICE
CERTIFICATE OF CORRECTION

PATENT NO. : 5,822,028
DATED     : October 13, 1998
INVENTOR(S) : MAMORU MIYAWAKI It is certified that error appears in the above-identified patent and that said Letters Patent is hereby corrected as shown below:

COLUMN 6

Line 14, "another" should read --other--.
    Line 18, "is" should read --are--.
    Line 30, "opposing" should read --opposite--.
    Line 32, "opposiing" should read --opposite--.

COLUMN 7

Line 66, "buried" should read --buried in the--.

COLUMN 8

Line 14, "up into" should be deleted.
    Line 20, "to apply to" should read --the application of--.
    Line 23, "As the result," should read --As a result,--.
    Line 31, "withstand pressure property" should read --ability to withstand pressure--.
    Line 32, "the free degree" should read --degree of freedom from defects--.
    Line 33, "matter that the" should read --monocrystal--.
    Line 33-34, "as the switch consisting of monocrystal makes enough to deal with the" should read --switch makes--.
    Line 42, "consists" should read --consisting--.
    Line 44, "from" should read --by the--; and "the" should read --a--.
    Line 46, "affection" should read --effect--.

UNITED STATES PATENT AND TRADEMARK OFFICE
CERTIFICATE OF CORRECTION

PATENT NO. : 5,822,028
DATED : October 13, 1998
INVENTOR(S) : MAMORU MIYAWAKI

Page 3 of 3

It is certified that error appears in the above-identified patent and that said Letters Patent is hereby corrected as shown below:

COLUMN 9

Line 18, "form" should read --form a--.

COLUMN 10

Line 1, "each of" should be deleted.
    Line 2-3, "said of" should be deleted.
    Line 6, "being" should be deleted--.
    Line 8, "an" should read --wherein an--.
    Line 14, "the direction" should read --wherein the direction--.

Signed and Sealed this

Thirty-first Day of August, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,822,028

DATED : October 13, 1998

INVENTOR(S) : Mamoru Miyawaki

It is certified that error appears in the above-identified patent and that said Letters Patent is hereby corrected as shown below:

COLUMN 5

Line 4, "denotes" should read --denote--.

Signed and Sealed this

Thirtieth Day of November, 1999

Attest:

Q. TODD DICKINSON

Attesting Officer

Acting Commissioner of Patents and Trademarks